United States Patent
Baker et al.

(10) Patent No.: US 9,163,717 B2
(45) Date of Patent: Oct. 20, 2015

(54) MULTI-PIECE FLUID MANIFOLD FOR GAS TURBINE ENGINE

(75) Inventors: Stephanie M. Baker, East Hampton, CT (US); Marc J. Muldoon, Marlborough, CT (US); Alessio Pescosolido, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 607 days.

(21) Appl. No.: 13/459,532

(22) Filed: Apr. 30, 2012

(65) Prior Publication Data

US 2013/0283756 A1    Oct. 31, 2013

(51) Int. Cl.

| F01D 25/18 | (2006.01) |
|---|---|
| F02C 7/14 | (2006.01) |
| F16H 57/04 | (2010.01) |
| F02K 3/06 | (2006.01) |
| F02C 7/06 | (2006.01) |
| F02C 7/36 | (2006.01) |

(52) U.S. Cl.
CPC ............ F16H 57/0427 (2013.01); F01D 25/18 (2013.01); F02C 7/06 (2013.01); F02C 7/36 (2013.01); F02K 3/06 (2013.01); F16H 57/0486 (2013.01); F02C 7/14 (2013.01); *Y10T 137/85938* (2015.04)

(58) Field of Classification Search
CPC ......... F01D 25/18; F01D 25/20; F01D 25/25; F01D 15/12; F02C 7/14; F02C 7/06; F02C 7/36; F16H 57/042; F16H 57/0421; F16H 57/0423; F16H 57/0424; F16H 47/0427; F16H 47/0486; Y10T 403/64; Y10T 403/645; Y10T 403/648

USPC ............ 60/39.08, 802, 796, 797, 798, 39.01; 184/6.11; 137/564; 415/122.1; 416/170 R

See application file for complete search history.

(56) References Cited

U.S. PATENT DOCUMENTS

| 1,588,632 | A | * | 6/1926 | Sullivan ....................... 60/39.08 |
|---|---|---|---|---|
| 2,180,795 | A | * | 11/1939 | Christensen ................. 277/448 |
| 2,971,334 | A | * | 2/1961 | Carlson .......................... 60/791 |
| 3,713,461 | A | * | 1/1973 | Notelteirs ............... 137/625.18 |
| 3,908,379 | A | * | 9/1975 | Fitzgerald ........................ 60/595 |
| 4,152,032 | A | * | 5/1979 | Pierpoline et al. ............. 384/131 |
| 4,153,141 | A | * | 5/1979 | Methlie .......................... 184/6.2 |
| 4,243,156 | A | * | 1/1981 | Lobbestael ................ 222/541.6 |
| 4,265,334 | A | * | 5/1981 | Benhase, Jr. ................. 184/6.11 |
| 4,344,506 | A | * | 8/1982 | Smith ........................ 184/6.11 |
| 4,553,855 | A | * | 11/1985 | De Choudhury ............... 384/99 |
| 4,799,354 | A | | 1/1989 | Midgley |
| 4,916,894 | A | | 4/1990 | Adamson et al. |
| 4,969,325 | A | | 11/1990 | Adamson et al. |

(Continued)

OTHER PUBLICATIONS

International Search Report and Written Opinion for International Application No. PCT/US2013/038569 completed on Feb. 6, 2014.

(Continued)

*Primary Examiner* — William H Rodriguez
*Assistant Examiner* — Eric Linderman
(74) *Attorney, Agent, or Firm* — Carlson, Gaskey & Olds, PC

(57) ABSTRACT

A manifold assembly for a gas turbine engine includes a mounting plate configured for attachment to a housing structure and a flow plate that is attached to the mounting plate. One or more flow passages are defined between the mounting plate and flow plate.

10 Claims, 8 Drawing Sheets

(56) References Cited

U.S. PATENT DOCUMENTS

| | | | | |
|---|---|---|---|---|
| 5,018,407 | A * | 5/1991 | Hoecht | 74/606 R |
| 5,119,905 | A | 6/1992 | Murray | |
| 5,183,342 | A * | 2/1993 | Daiber et al. | 384/475 |
| 5,398,843 | A * | 3/1995 | Warden et al. | 220/711 |
| 6,058,694 | A | 5/2000 | Ackerman et al. | |
| 6,746,152 | B2 * | 6/2004 | Branagan | 384/122 |
| 6,997,618 | B2 * | 2/2006 | Delano | 384/462 |
| 7,329,048 | B2 * | 2/2008 | Klusman et al. | 384/99 |
| 7,493,753 | B2 | 2/2009 | Moniz et al. | |
| 7,662,059 | B2 * | 2/2010 | McCune | 475/159 |
| 7,883,439 | B2 * | 2/2011 | Sheridan et al. | 475/159 |
| 8,042,341 | B2 * | 10/2011 | Charier et al. | 60/788 |
| 8,398,517 | B2 * | 3/2013 | McCune et al. | 475/159 |
| 8,893,469 | B2 * | 11/2014 | DiBenedetto et al. | 60/204 |
| 8,894,529 | B2 * | 11/2014 | McCune | 475/159 |
| 9,046,036 | B2 * | 6/2015 | Petitjean | 1/1 |
| 2003/0039421 | A1 * | 2/2003 | Fisher et al. | 384/462 |
| 2004/0237531 | A1 * | 12/2004 | Hirasaki | 60/740 |
| 2006/0059887 | A1 * | 3/2006 | Klingels et al. | 60/204 |
| 2006/0223664 | A1 * | 10/2006 | Duong et al. | 475/159 |
| 2007/0028589 | A1 * | 2/2007 | Alexander et al. | 60/39.08 |
| 2007/0119184 | A1 * | 5/2007 | Satou et al. | 60/805 |
| 2007/0245709 | A1 * | 10/2007 | Dooley | 60/226.1 |
| 2008/0096714 | A1 * | 4/2008 | McCune | 475/159 |
| 2008/0127627 | A1 * | 6/2008 | Jewess et al. | 60/39.08 |
| 2008/0135336 | A1 * | 6/2008 | Jewess et al. | 184/6.11 |
| 2008/0173114 | A1 * | 7/2008 | Charier et al. | 74/15.63 |
| 2009/0090096 | A1 * | 4/2009 | Sheridan | 60/226.3 |
| 2009/0252604 | A1 * | 10/2009 | Alexander et al. | 415/180 |
| 2010/0084872 | A1 * | 4/2010 | Winiasz | 290/55 |
| 2010/0096395 | A1 * | 4/2010 | Miller | 220/711 |
| 2010/0154217 | A1 | 6/2010 | Sheridan et al. | |
| 2010/0212281 | A1 | 8/2010 | Sheridan | |
| 2010/0317477 | A1 * | 12/2010 | Sheridan et al. | 475/159 |
| 2010/0317478 | A1 * | 12/2010 | McCune et al. | 475/159 |
| 2011/0056208 | A1 | 3/2011 | Norris et al. | |
| 2011/0108360 | A1 | 5/2011 | DiBenedetto | |
| 2013/0319006 | A1 * | 12/2013 | Parnin et al. | 60/805 |

OTHER PUBLICATIONS

International Preliminary Report on Patentability, dated Nov. 13, 2014.

* cited by examiner

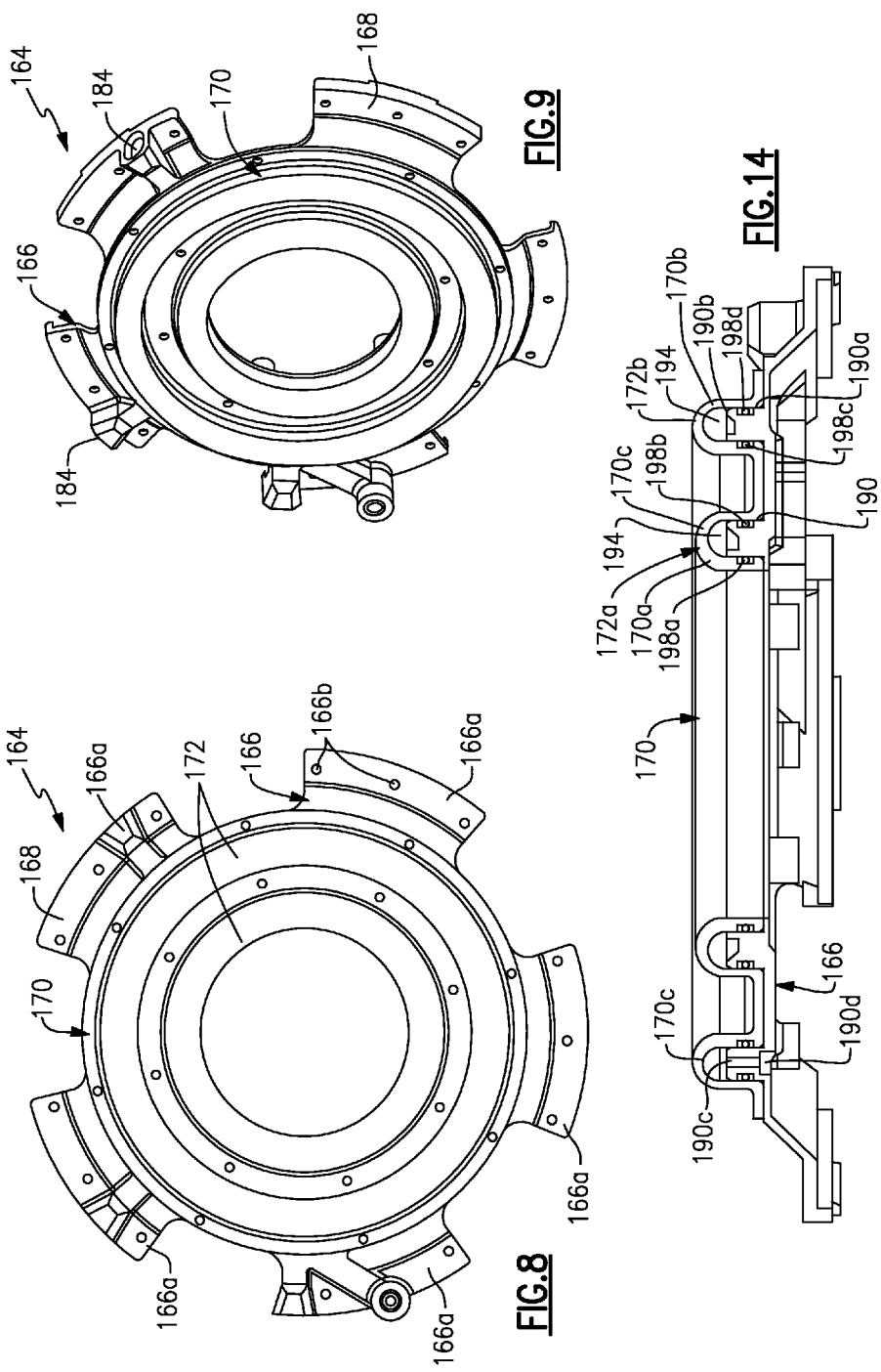

MULTI-PIECE FLUID MANIFOLD FOR GAS TURBINE ENGINE

BACKGROUND

A typical jet engine has multiple shafts or spools that transmit torque between turbine and compressor sections of the engine. In one example, a low speed spool generally includes a low shaft that interconnects a fan, a low pressure compressor, and a low pressure turbine. A high speed spool generally includes a high shaft that interconnects a high pressure compressor and a high pressure turbine. The low shaft rotates at a slower speed than the high shaft, and further, the low shaft is connected to the fan through a geared architecture to drive the fan at a lower speed than the low speed spool.

An oil manifold is mounted to a housing of the geared architecture to lubricate gears within the housing. Traditionally, the oil manifold has comprised a single-piece part that comprises a cast component with cored flow passages. These passages are difficult to manufacture and inspect. Furthermore, castings are prone to porosity defects that may not be identified during manufacturing inspection but can later develop into cracks and subsequent part failure during operation.

SUMMARY

In one exemplary embodiment, a manifold assembly for a gas turbine engine comprises a mounting plate having a mount interface configured for attachment to a housing and a flow plate attached to the mounting plate to provide at least one flow passage therebetween.

In a further embodiment of the above, the mounting plate defines a first passage portion for each flow passage and the flow plate defines a remaining portion for each flow passage, and wherein the first portion and remaining portion are aligned with each other to form the at least one flow passage.

In a further embodiment of any of the above, the mounting plate includes a first end face configured to face the housing and a second end face that faces the flow plate, and wherein the mounting plate includes plurality of ports extending through the mounting plate from the first end face to the second end face.

In a further embodiment of any of the above, each port includes a raised boss portion that extends outwardly from the second end face, the raised boss portions extending into the remaining portion of the flow plate.

In a further embodiment of any of the above, an outer peripheral surface of the raised boss portions are sealed against an inner surface of the remaining portion of the flow plate with at least one seal.

In a further embodiment of any of the above, at least one seal comprises a pair of seals that contact each raised boss portion, with a first seal sealing a radially inner boss surface and a second seal sealing a radially outer boss surface.

In a further embodiment of any of the above, the flow plate comprises a ring-shaped structure with a center opening defining a center axis and a ring portion defined by an inner peripheral surface extending circumferentially about the axis and an outer peripheral surface spaced radially outwardly relative to the inner peripheral surface.

In a further embodiment of any of the above, the at least one flow passage comprises a plurality of flow passages including at least a first flow passage formed adjacent to the inner peripheral surface and a second flow passage formed adjacent to the outer peripheral surface.

In a further embodiment of any of the above, first and second flow passages are not fluidly connected to each other.

In a further embodiment of any of the above, first and second flow passages extend circumferentially around the ring portion to at least partially surround the central axis.

In a further embodiment of any of the above, the first and second flow passages extend completely around the central axis.

In a further embodiment of any of the above, the mounting plate includes a first plurality of ports associated with the first flow passage and a second plurality of ports associated with the second flow passage, and wherein each port comprises a raised boss portion having an outer surface that is sealed against an inner flow passage surface of the flow plate.

In a further embodiment of any of the above, at least one port defines an inlet in fluid communication with the flow plate and an outlet configured to direct fluid to a gear assembly located within the housing, and wherein the inlet is defined by a first diameter and the outlet is defined by a second diameter that is different than the first diameter.

In a further embodiment of any of the above, the first flow passage includes a first radially innermost surface and a first radially outermost surface and the second flow passage includes a second radially innermost surface and a second radially outermost surface, and including a first seal engaging the first radially innermost surface, a second seal engaging the first radially outermost surface, a third seal engaging the second radially innermost surface, and a fourth seal engaging the second radially outermost surface.

In another exemplary embodiment, a gas turbine engine comprises a first shaft that interconnects a fan, a low pressure compressor, and a low pressure turbine; a second shaft that interconnects a high pressure compressor and a high pressure turbine, the second shaft configured to rotate at a faster speed than the first shaft; a geared architecture that interconnects the first shaft to drive the fan, the geared architecture comprising a gear assembly enclosed within a gear housing; and a manifold assembly comprising a mounting plate having a mount interface attached to the gear housing and a flow plate attached to the mounting plate to provide a plurality of flow passages between the mounting plate and flow plate, the manifold assembly including at least one fluid inlet configured to receive fluid from a supply and at least one fluid outlet to direct the fluid into the gear housing.

In a further embodiment of any of the above, the flow plate comprises a ring-shaped structure with a center opening defining a center axis and a first ring portion defined by a first inner peripheral surface extending circumferentially about the axis and a first outer peripheral surface spaced radially outwardly relative to the first inner peripheral surface; and wherein the mounting plate comprises a ring-shaped structure with a center opening concentric with the center axis and a second ring portion defined by a second inner peripheral surface extending circumferentially about the axis and a second outer peripheral surface spaced radially outwardly relative to the second inner peripheral surface; and wherein the plurality of flow passages comprises at least a first flow passage formed adjacent to the first and second inner peripheral surfaces and a second flow passage formed adjacent to the first and second outer peripheral surfaces, the first and second flow passages extending circumferentially around the first and second ring portions to at least partially surround the central axis.

In a further embodiment of any of the above, the mounting plate includes a first plurality of ports associated with the first flow passage and a second plurality of ports associated with the second flow passage, and wherein each port comprises a raised boss portion having an outer surface that is sealed against an inner flow passage surface of the flow plate, and wherein at least one port includes a port inlet that faces the flow plate and a port outlet that faces the gear housing.

In a further embodiment of any of the above, the first flow passage includes a first radially innermost surface and a first radially outermost surface and the second flow passage includes a second radially innermost surface and a second radially outermost surface, and including a first seal engaging the first radially innermost surface, a second seal engaging the first radially outermost surface, a third seal engaging the second radially innermost surface, and a fourth seal engaging the second radially outermost surface.

In a further embodiment of any of the above, the first, second, third, and fourth seals comprise o-rings.

In a further embodiment of any of the above, the mounting plate includes one or more flange portions formed about an outer periphery of the mounting plate to provide the mount interface.

BRIEF DESCRIPTION OF THE DRAWINGS

The disclosure can be further understood by reference to the following detailed description when considered in connection with the accompanying drawings wherein:

FIG. 8 is an end view of another example of a manifold assembly comprised of a mounting plate and a flow plate.

FIG. 9 is a perspective view of the manifold assembly of FIG. 8.

FIG. 14 is a cross-sectional view of the manifold assembly of FIG. 8.

DETAILED DESCRIPTION

Figure 1:
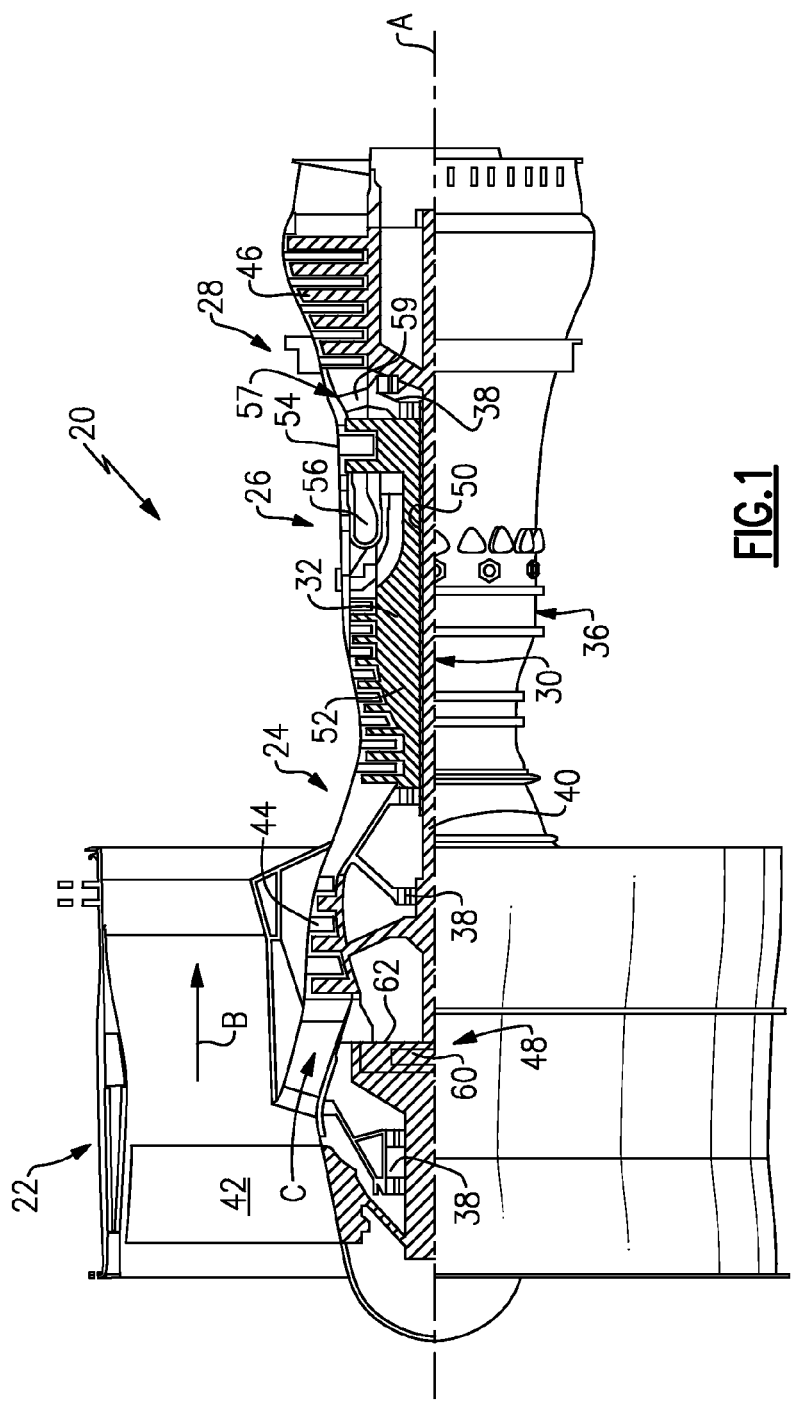
FIG. 1 schematically illustrates a gas turbine engine embodiment.
Figure 2:
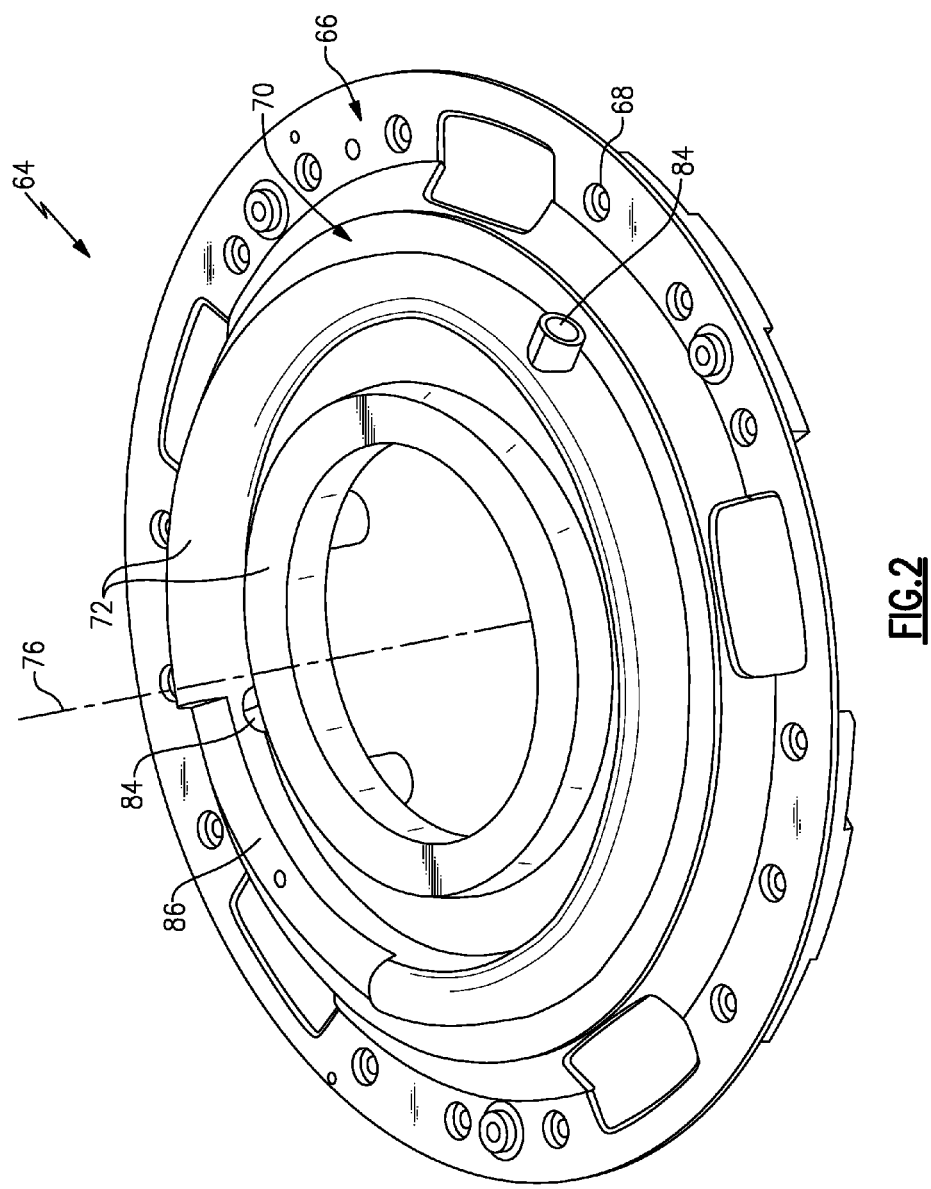
FIG. 2 is a perspective view of a manifold assembly comprised of a mounting plate and a flow plate secured to the mounting plate.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The geared architecture comprises a gear assembly 60 enclosed within a gear housing 62. The gear assembly 60 couples the inner shaft 40 to a rotating fan structure. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system (sun gear in meshing engagement with a plurality of star gears supported by a carrier and in meshing engagement with a ring gear) or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of 1 bm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

FIGS. 2-7 show one example of a manifold assembly 64 that is attached to a gear structure of the gear assembly 60 (FIG. 1), such as the carrier for example. The manifold assembly 64 is comprised of a mounting plate 66 having a mount interface 68 configured for attachment to the gear structure and a flow plate 70 attached to the mounting plate 66 to provide at least one flow passage 72 between the mounting plate 66 and flow plate 70.

Figure 4:
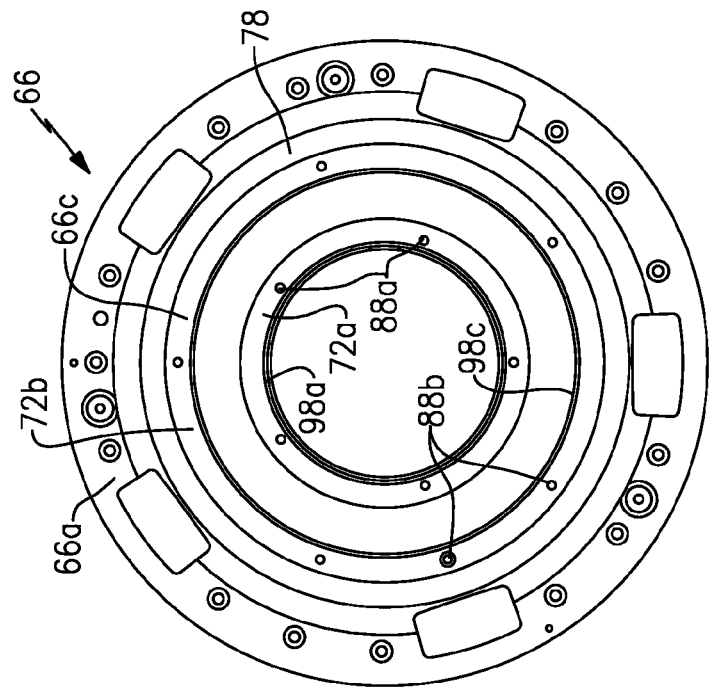
FIG. 4 is an opposite end view of the mounting plate of FIG. 3.
Figure 3:
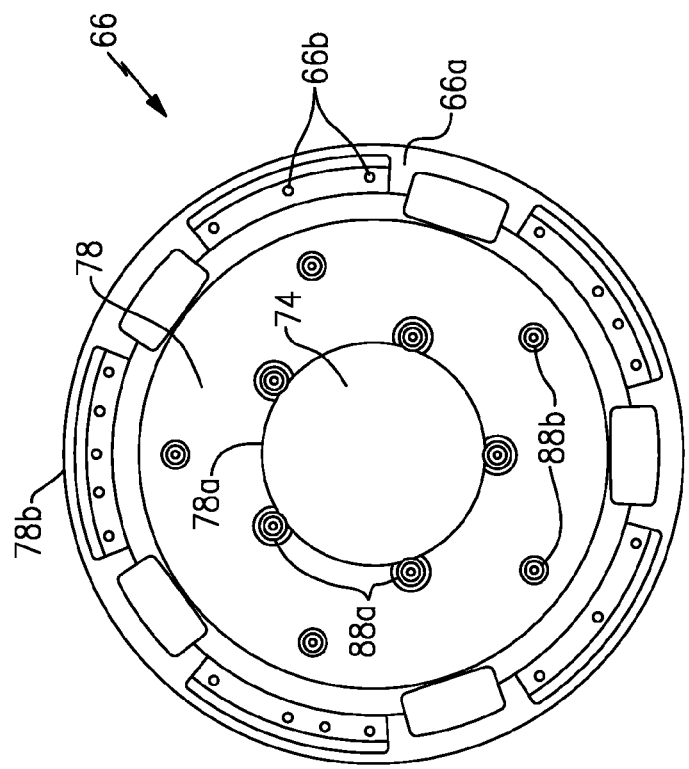
FIG. 3 is an end view of the mounting plate of FIG. 2.

As shown in FIGS. 3-4, the mounting plate 66 comprises a ring-shaped structure with a center opening 74 defining a center axis 76 (FIG. 2) and a ring portion 78 defined by an inner peripheral surface 78a extending circumferentially about the axis 76 and an outer peripheral surface 78b spaced radially outwardly relative to the inner peripheral surface 78a. The mounting plate 66 can be attached to the gear structure in any of various ways. In one example, the mounting plate 66 includes a flange portion 66a that is formed about the outer peripheral surface 78b to provide a mount interface to the gear structure. The flange portion 66a includes a plurality of holes 66b that receive fasteners (not shown) to securely attach the mounting plate 66 to the gear structure. Optionally, the manifold could be secured to the gear structure at the inner periphery, or the manifold could be attached using the same bolts that are used to secure the mounting plate 66 and flow plate 70 together.

Figure 6:
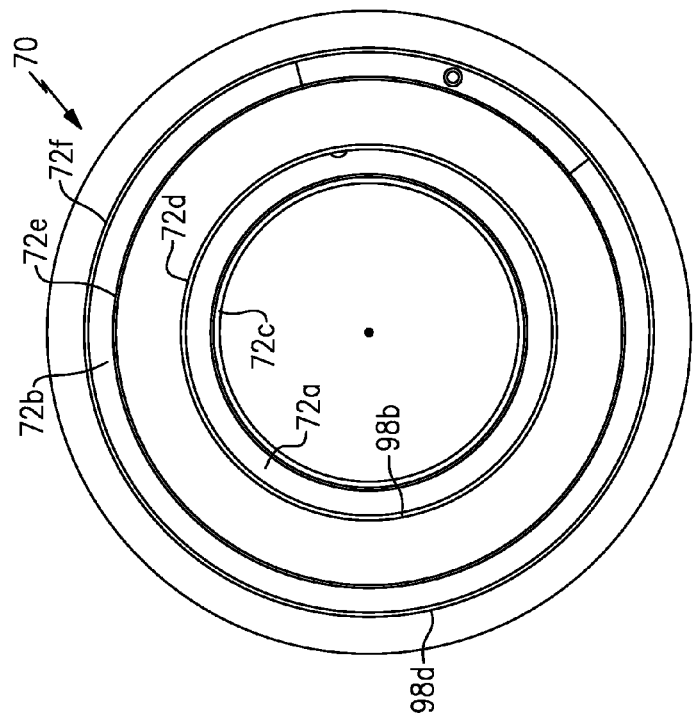
FIG. 6 is an opposite end view of the flow plate of FIG. 5.
Figure 5:
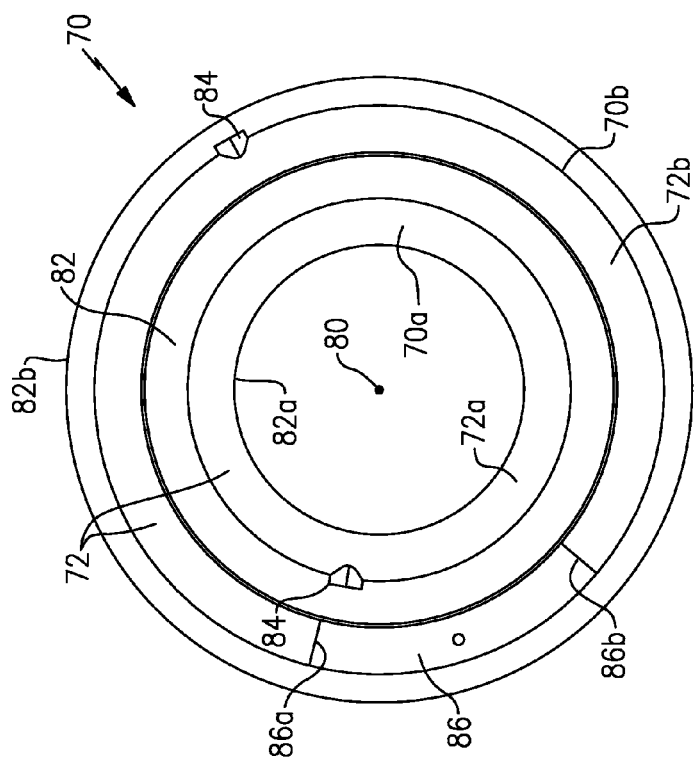
FIG. 5 is an end view of the flow plate of FIG. 2.

As shown in FIGS. 5-6, the flow plate 70 comprises a ring-shaped structure with a center opening 80 concentric with the center axis 76 and a ring portion 82 defined by an inner peripheral surface 82a extending circumferentially about the axis 76 and an outer peripheral surface 82b spaced radially outwardly relative to the inner peripheral surface 82a.

The mounting plate 66 and flow plate 70 are positioned such that portions of the ring portions 78, 82 are overlapped with each other to form one or more flow passages 72. In the example shown, a first flow passage 72a is formed adjacent to the inner peripheral surface 82a of the flow plate 70 and a second flow passage 72b formed adjacent to the outer peripheral surface 82b.

In the example shown, the first 72a and second 72b flow passages are not fluidly connected to each other, i.e. the first 72a and second 72b are discrete, separate flow passages. Each flow passage 72a, 72b has a fluid inlet 84 (FIG. 2) that receives fluid from a supply. In the example shown in FIGS. 2-7, the fluid inlets 84 are formed within the flow plate 70. The first 72a and second 72b flow passages extend circumferentially around the ring portion 82 to at least partially surround the central axis 76. In the configuration shown in FIGS. 2-7 the first flow passage 72a extends completely around the central axis 76, while the second flow passage 72b extends only partially around the central axis 76 to provide an interrupted area 86 with sealed end faces 86a, 86b. This facilitates mounting and packaging of adjacent engine components. FIGS. 8-14 show another example configuration where both flow passages extend completely around the central axis 76. This configuration will be discussed in greater detail below.

Figure 7:
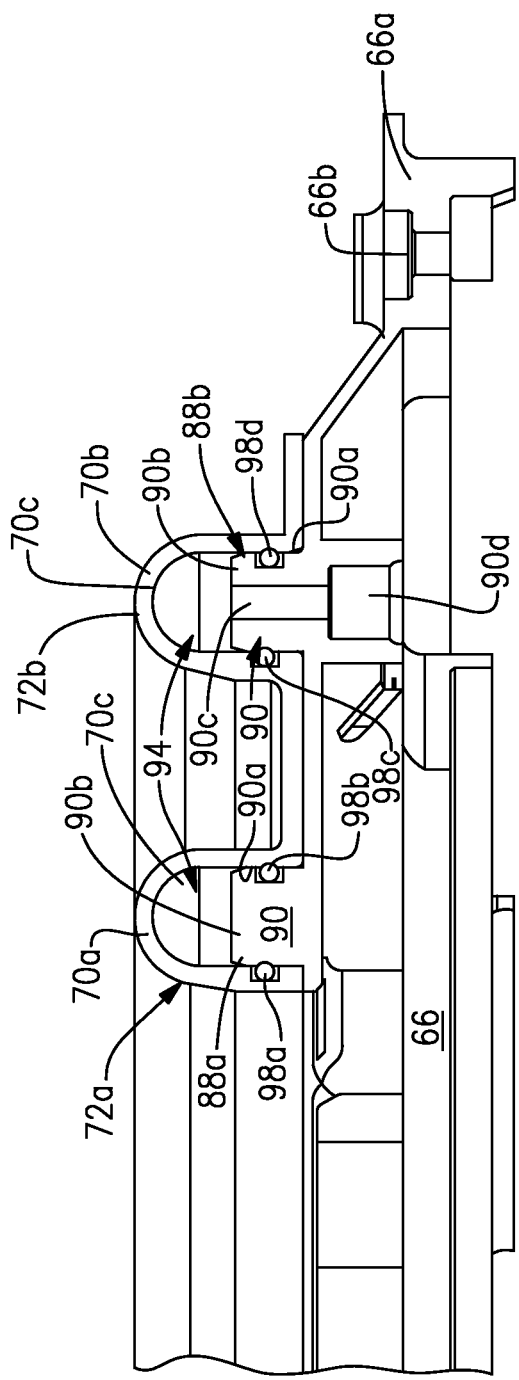
FIG. 7 is a cross-sectional view of the manifold assembly of FIG. 2.

As shown in FIGS. 3 and 4, the mounting plate 66 includes a first plurality of ports 88a associated with the first flow passage 72a and a second plurality of ports 88b associated with the second flow passage 72b. Each port 88a, 88b comprises a raised boss portion 90 having an outer peripheral surface 90a that extends to a distal end 90b as shown in FIG. 7. The flow plate 70 includes a radially inner raised portion 70a and a radially outward raised portion 70b that respectively define the first and second flow passages 72a, 72b. In the example shown, the raised portions 70a, 70b comprised curved outward surfaces that extend outwardly from an end face of the flow plate 70 that faces away from the gear housing 62. The curved surface is just one example utilized to provide the flow passages; it should be understood that other shapes could also be used. The raised portions 70a, 70b define inner surfaces 70c that face the mounting plate 66.

The outer peripheral surface 90a of the raised boss portion 90 is sealed against the inner surface 70c of the flow plate 70 that define the flow passages 72a, 72b. A flow area 94 is defined between the distal ends 90b of the raised boss portions 90 and a remaining portion of the inner surface 70c of the flow plate and passage surface 66c of the mounting plate 66 that overlaps with the raised portions 70a, 70b.

One or more of the ports 88a, 88b define a port inlet 90c in fluid communication the flow area 94 and a port outlet 90d configured to direct fluid to the gear assembly 60 located within the gear housing 62 via transfer tubes (not shown). In one example, the inlet 90c is defined by a first diameter and the outlet 90d is defined by a second diameter that is different than the first diameter. In the example shown, the second diameter is greater than the first diameter.

The first flow passage 72a includes a radially innermost surface 72c and a radially outermost surface 72d and the second flow passage 72b includes a radially innermost surface 72e and a radially outermost surface 72f. A plurality of seals are used to seal these surfaces. In one example, a first seal 98a engages the radially innermost surface 72c and a second seal 98b engages the radially outermost surface 72d to seal the first flow passage 72a. A third seal 98c engages the radially innermost surface 72e and a fourth seal 98d engages the radially outermost surface 72f to seal the second flow passage 72b. In one example, the seals 98a-d comprise radial o-ring seals that extend completely around the center axis 76.

FIGS. 8-14 show another example of a manifold assembly 164 that is attached to a gear structure, such as a carrier for example. The manifold assembly 164 is comprised of a mounting plate 166 having a mount interface 168 configured for attachment to the gear structure and a flow plate 170 attached to the mounting plate 166 to provide at least one flow passage 172 between the mounting plate 166 and flow plate 170.

Figure 11:
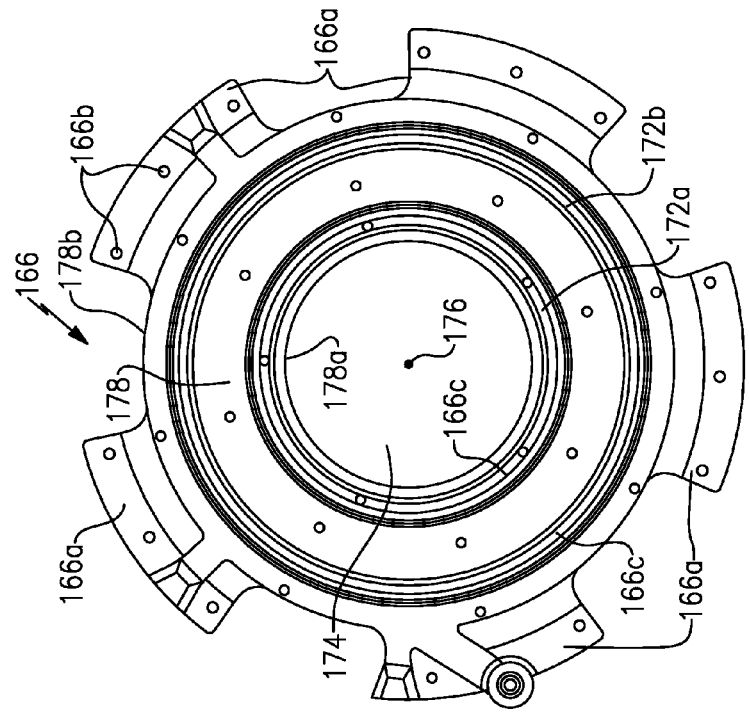
FIG. 11 is an opposite end view of the mounting plate of FIG. 10.
Figure 10:
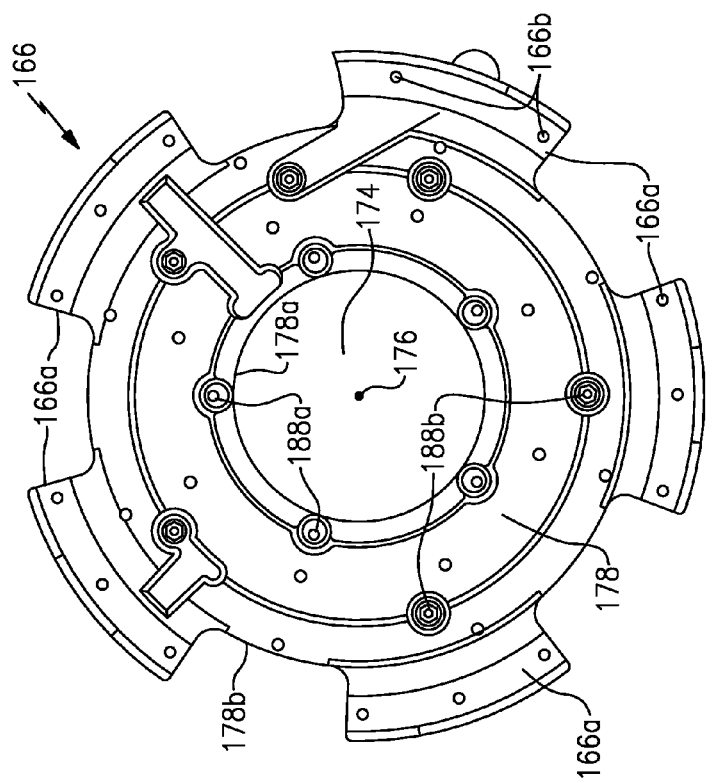
FIG. 10 is an end view of the mounting plate of FIG. 8.

As shown in FIGS. 10-11, the mounting plate 166 comprises a ring-shaped structure with a center opening 174 defining a center axis 176 and a ring portion 178 defined by an inner peripheral surface 178a extending circumferentially about the axis 176 and an outer peripheral surface 178b spaced radially outwardly relative to the inner peripheral surface 178a. The mounting plate 166 includes a plurality of flange portions 166a that are formed about the outer peripheral surface 178b to provide a mount interface to the gear structure. The flange portions 166a are circumferentially spaced apart from each other and each flange portion 166a includes at least one hole 166b that receives a fastener (not shown) to securely attach the mounting plate 166 to the gear structure.

Figure 13:
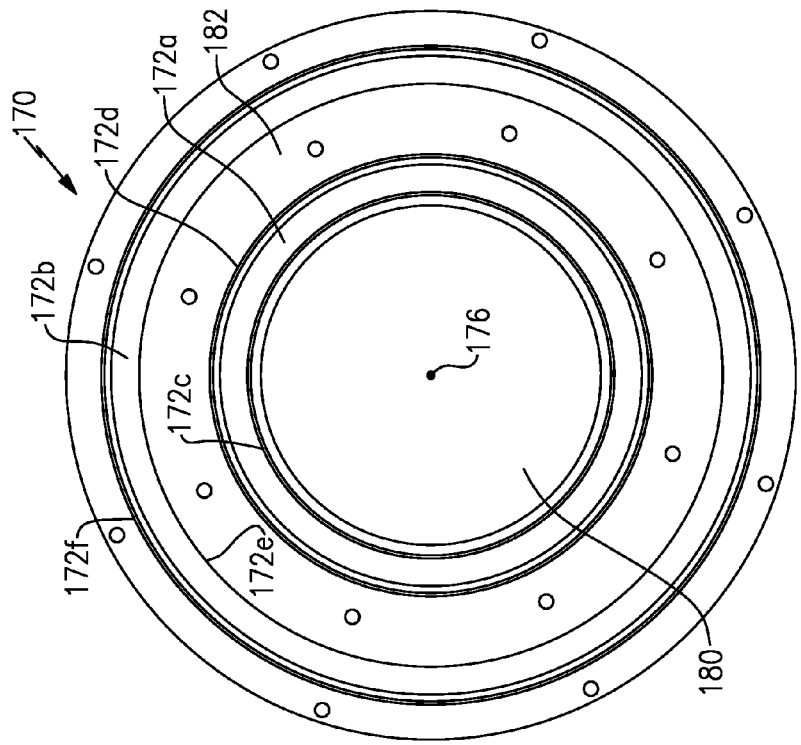
FIG. 13 is an opposite end view of the flow plate of FIG. 12.
Figure 12:
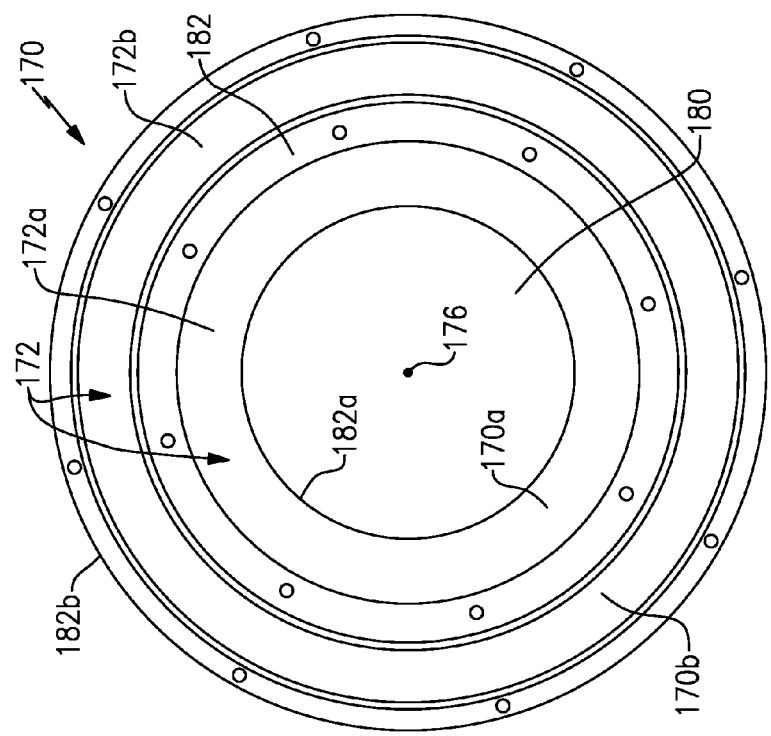
FIG. 12 is an end view of the flow plate of FIG. 8.

As shown in FIGS. 12-13, the flow plate 170 comprises a ring-shaped structure with a center opening 180 concentric with the center axis 176 and a ring portion 182 defined by an inner peripheral surface 182a extending circumferentially about the axis 176 and an outer peripheral surface 182b spaced radially outwardly relative to the inner peripheral surface 182a.

The mounting plate 166 and flow plate 170 are positioned such that portions of the ring portions 178, 182 are overlapped with each other to form one or more flow passages 172. In the example shown, a first flow passage 172a is formed adjacent to the inner peripheral surface 182a of the flow plate 170 and a second flow passage 172b formed adjacent to the outer peripheral surface 182b.

In the example shown, the first 172a and second 172b flow passages are not fluidly connected to each other, i.e. the first 172a and second 172b are discrete, separate flow passages. Each flow passage 172a, 172b has a fluid inlet 184 (FIG. 9) that receives fluid from a supply. In the example shown in FIGS. 8-14, the fluid inlets 184 are formed within the mounting plate 166. The first 172a and second 172b flow passages extend circumferentially around the ring portion 182 to at least partially surround the central axis 176. FIGS. 8-14 show a configuration where both flow passages 172a, 172b extend completely around the central axis 176.

As shown in FIGS. 10 and 11, the mounting plate 166 includes a first plurality of ports 188a associated with the first flow passage 172a and a second plurality of ports 188b associated with the second flow passage 172b. Each port 188a, 188b comprises a raised boss portion 190 having an outer peripheral surface 190a that extends to a distal end 190b as shown in FIG. 14. The flow plate 170 includes a radially inner raised portion 170a and a radially outward raised portion 170b that respectively define the first and second flow passages 172a, 172b. In the example shown, the raised portions 170a, 170b comprised curved outward surfaces that extend outward from an end face of the flow plate 170 that faces away from the gear housing 62. The curved surface is just one example utilized to provide the flow passages; it should be understood that other shapes could also be used. The raised portions 170a, 170b define inner surfaces 170c that face the mounting plate 166.

The outer peripheral surface 190a of the raised boss portion 190 is sealed against the inner surfaces 170c of the flow plate 170 that define the flow passages 172a, 172b. A flow area 194 is defined between the distal ends 190b of the raised boss portions 190 and a remaining portion of the inner surface 170c of the flow plate 170 and passage surface 166c of the mounting plate 166 that overlaps with the raised portions 170a, 170b.

One or more of the ports 188a, 188b define a port inlet 190c in fluid communication the flow area 194 and a port outlet 190d configured to direct fluid to the gear assembly 60 located within the gear housing 62 via transfer tubes (not shown). In one example, the inlet 190c is defined by a first diameter and the outlet 190d is defined by a second diameter that is different than the first diameter. In the example shown, the second diameter is greater than the first diameter.

The first flow passage 172a includes a radially innermost surface 172c and a radially outermost surface 172d and the second flow passage 172b includes a radially innermost surface 172e and a radially outermost surface 172f. Seals are used to on these surfaces to seal the flow passages 172a, 172b. In one example, a first seal 198a engages the radially innermost surface 172c and a second seal 198b engages the radially outermost surface 172d to seal the first flow passage 172a. A third seal 198c engages the radially innermost surface 172e and a fourth seal 198d engages the radially outermost surface 172f to seal the second flow passage 172b. In one example, the seals 198a-d comprise radial o-ring seals that extend completely around the center axis 176.

In each of the disclosed examples, the manifold assembly 64, 164 is formed from two separate pieces, i.e. a mounting plate 66, 166 and a flow plate 70, 170 that are fitted together to create enclosed fluid flow passages 72, 172. The radial o-ring seals prevent the fluid from leaking out of the flow passages. This two-piece configuration allows for many different manufacturing methods to be used and is less expensive to manufacture. This is because the two-piece configuration negates the need for cored passages, previously required by the single-piece cast component, which were difficult to inspect and resulted in a high scrap rate. For example, both the flow plate and mounting plate can be comprised of machined components of an aluminum material, for example, which is produced with a significantly lower cost than a cast component with cored passages.

In either configuration, fluid is easily carried to and from the manifold utilizing transfer tubes. The tubes can be routed above the manifold assembly (between the manifold and torque frame) or below the manifold (between the carrier and manifold) in either configuration. Additionally, the mounting plate can be made to be flush with or integral to the carrier of the gear assembly 60.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
    a first shaft that interconnects a fan, a low pressure compressor, and a low pressure turbine;
    a second shaft that interconnects a high pressure compressor and a high pressure turbine, the second shaft configured to rotate at a faster speed than the first shaft;
    a geared architecture that interconnects the first shaft to drive the fan, the geared architecture comprising a gear assembly enclosed within a gear housing;
    a manifold assembly comprising a mounting plate having a mount interface attached to the gear housing and a flow plate attached to the mounting plate to provide a plurality of flow passages between the mounting plate and flow plate, the manifold assembly including at least one fluid inlet configured to receive fluid from a supply and at least one fluid outlet to direct the fluid into the gear housing;
    wherein the flow plate comprises a ring-shaped structure with a center opening defining a center axis and a first ring portion defined by a first inner peripheral surface extending circumferentially about the axis and a first outer peripheral surface spaced radially outwardly relative to the first inner peripheral surface;
    wherein the mounting plate comprises a ring-shaped structure with a center opening concentric with the center axis and a second ring portion defined by a second inner peripheral surface extending circumferentially about the axis and a second outer peripheral surface spaced radially outwardly relative to the second inner peripheral surface; and
    wherein the plurality of flow passages comprises at least a first flow passage formed adjacent to the first and second inner peripheral surfaces and a second flow passage formed adjacent to the first and second outer peripheral surfaces, the first and second flow passages extending circumferentially around the first and second ring portions to at least partially surround the central axis.

2. The gas turbine engine according to claim 1 wherein the mounting plate includes a first plurality of ports associated with the first flow passage and a second plurality of ports associated with the second flow passage, and wherein each port comprises a raised boss portion having an outer surface that is sealed against an inner flow passage surface of the flow plate, and wherein at least one port includes a port inlet that faces the flow plate and a port outlet that faces the gear housing.

3. The gas turbine engine according to claim 2 wherein the first flow passage includes a first radially innermost surface and a first radially outermost surface and the second flow passage includes a second radially innermost surface and a second radially outermost surface, and including a first seal engaging the first radially innermost surface, a second seal engaging the first radially outermost surface, a third seal engaging the second radially innermost surface, and a fourth seal engaging the second radially outermost surface.

4. The gas turbine engine according to claim 3 wherein the first, second, third, and fourth seals comprise o-rings.

5. The gas turbine engine according to claim 1 wherein the mounting plate includes one or more flange portions formed about an outer periphery of the mounting plate to provide the mount interface.

6. The gas turbine engine according to claim 1 wherein the mounting plate and flow plate are separate pieces that are secured together to form the flow passages.

7. The gas turbine engine according to claim 6 wherein the mounting plate and the flow plate each include openings configured to receive fasteners to attach the mounting plate and flow plate together.

8. The gas turbine engine according to claim 1 wherein the first and second flow passages are not fluidly connected to each other.

9. The gas turbine engine according to claim 8 wherein the at least one fluid inlet comprises a first fluid inlet to the first low passage and a second fluid inlet to the second flow passage, the first and second fluid inlets being separate from each other.

10. The gas turbine engine according to claim 8 wherein the second flow passage extends circumferentially about the first flow passage such that the second flow passage substantially surrounds the first flow passage.

* * * * *